United States Patent [19]
Sasaki

[11] Patent Number: 5,548,835
[45] Date of Patent: Aug. 20, 1996

[54] TRAIN RADIO COMMUNICATION SYSTEM

[75] Inventor: Yasutaka Sasaki, Tokyo, Japan

[73] Assignee: NEC Corporation, Japan

[21] Appl. No.: 349,068

[22] Filed: Dec. 2, 1994

[30] Foreign Application Priority Data

Dec. 6, 1993 [JP] Japan ................................ 5-305553

[51] Int. Cl.⁶ .............................. H04B 1/06; H04B 7/00
[52] U.S. Cl. .................................. 455/277.1; 455/277.2; 455/134; 455/133; 455/33.1; 455/66
[58] Field of Search ......................... 455/13.1, 66, 67.1, 455/133, 134, 272, 277.1, 277.2, 33.1; 246/122 R; 340/933, 991, 992

[56] References Cited

U.S. PATENT DOCUMENTS

| 4,151,969 | 5/1979 | Wood | 246/122 R |
| 4,317,229 | 2/1982 | Craig et al. | 455/134 |
| 4,863,123 | 9/1989 | Bernard et al. | 246/122 R |

FOREIGN PATENT DOCUMENTS 61-72421   4/1986   Japan .

OTHER PUBLICATIONS

S. Yonezawa, Dr. Eng., "Microwave Communication—System Design and New Equipment–", 1970, Maruzen Company, Ltd., total six pages (pp. 168–179).

Primary Examiner—Reinhard J. Eisenzopf
Assistant Examiner—Marsha D. Banks-Harold
Attorney, Agent, or Firm—Ostrolenk, Faber, Gerb & Soffen, LLP

[57] ABSTRACT

A train radio communication system includes a plurality of land communication equipments and a train communication equipment. The land communication equipments are arranged at predetermined intervals along a railroad on which a train travels and designed to output transmission signals having different frequencies. The train communication equipment is arranged in the train and designed to set a radio channel between the train communication equipment and one of the land communication equipments during travel of the train. The train communication equipment includes a plurality of antennas, an antenna switch, a receiver, and an antenna controller. The antennas respectively receive the transmission signals from the land communication equipments. The antenna switch selects one of the antennas. The receiver demodulates an output from the antenna selected by the antenna switch and outputs a reception signal. The antenna controller includes a current position detecting section for detecting a current traveling position of the train and controls the antenna switch in accordance with a current traveling position from the current position detecting section.

8 Claims, 6 Drawing Sheets

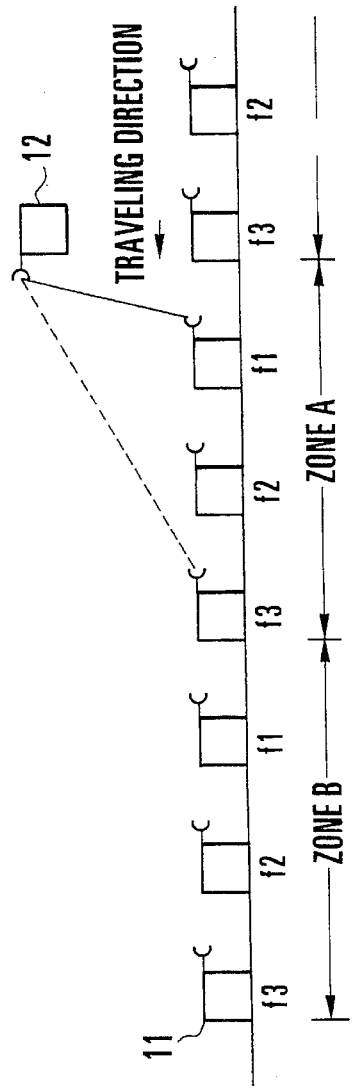
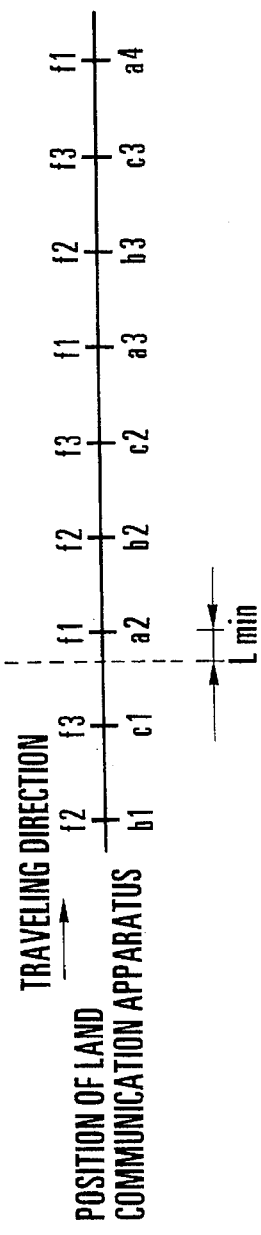
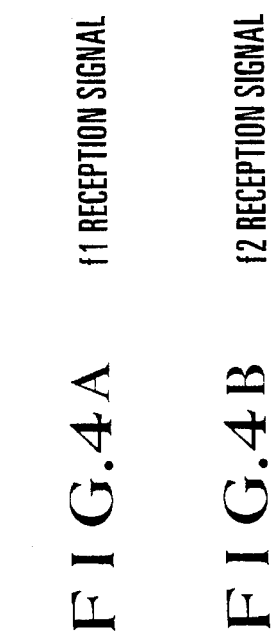
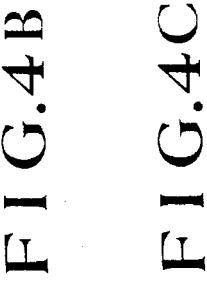
FIG.3
FIG.4A
FIG.4B
FIG.4C
FIG.4D

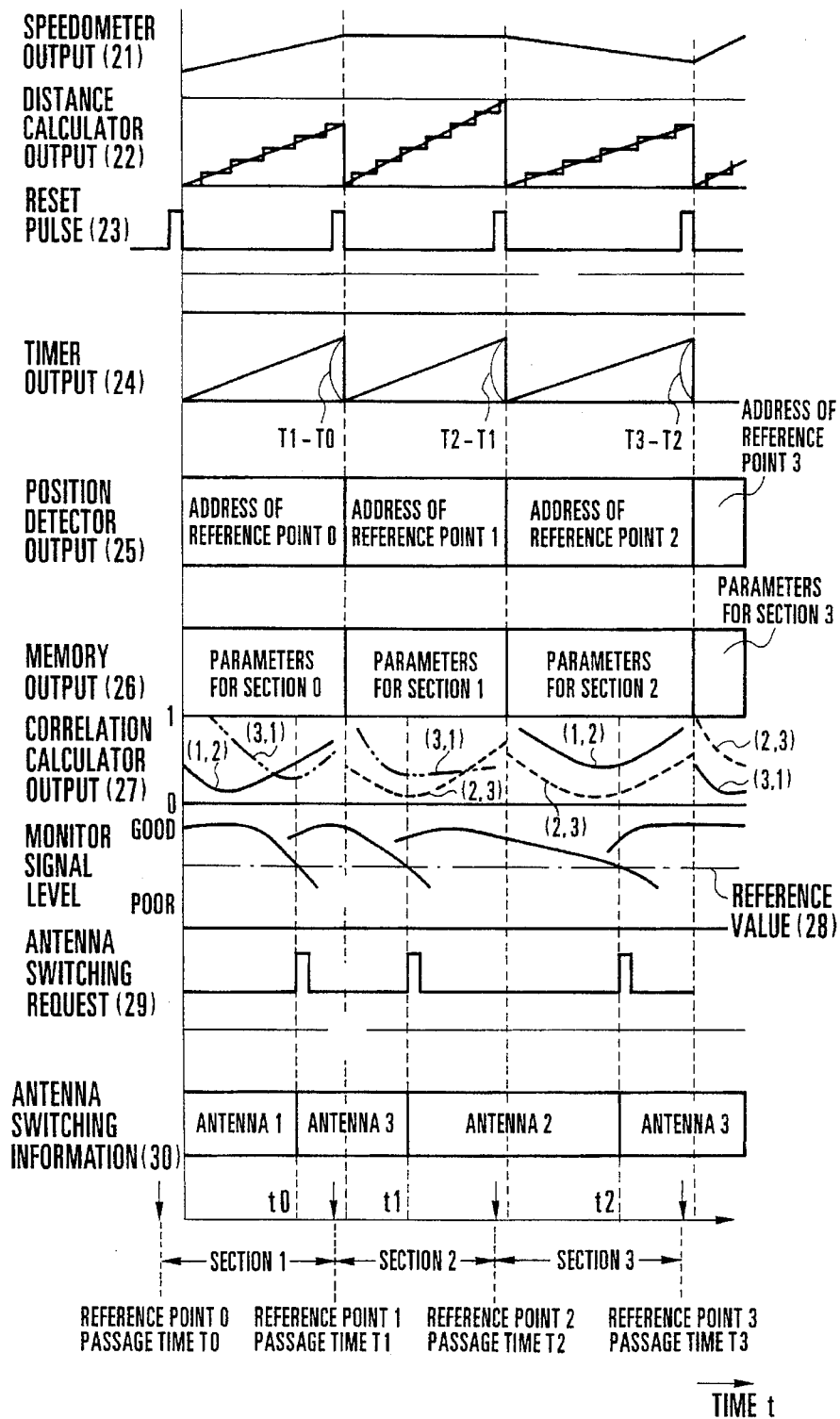

TRAIN RADIO COMMUNICATION SYSTEM

BACKGROUND OF THE INVENTION

The present invention relates to a train radio communication system of a diversity reception scheme and, more particularly, a train radio communication system for always holding the optimum communication quality in a train communication system.

FIG. 7 shows a conventional train radio communication system.

Various communicating schemes for a train radio communication system have been proposed and put into practice. Of these schemes, a space diversity reception scheme is highly evaluated. The basic arrangement of the space diversity reception scheme will be described below with reference to FIG. 7.

Referring to FIG. 7, a large number of land communication equipments 31 are installed at given intervals along a railroad on which a train travels, and a train communication equipment 32 performs communication while sequentially switching the land communication equipments 31 with which the train communication equipment 32 communicates during travel. FIGS. 7 shows a case wherein the train communication equipment 32 is communicating with one of the plurality of land communication equipments 31. The train communication equipment 32 comprises an antenna unit 321 constituted by a plurality of antennas 321a to 321n, a reception unit 322 constituted by a plurality of receivers 322a to 322n, a channel monitor unit 323 constituted by a plurality of channel monitors 323a to 323n, a channel quality comparator 324 for specifying a reception route having the optimum quality by comparing output results from the channel monitors 323a to 323n of the channel monitor unit 323, and a receiver selection switch 325 for selecting one of reception outputs from the receivers 322a to 322n on the basis of the comparison result obtained by the channel quality comparator 324.

The antennas 321a to 321n, the receivers 322a to 322n, and the channel monitors 323a to 323n are arranged in a one-to-one correspondence, and respectively constitute independent reception routes. That is, an RF signal modulated/transmitted by/from the land communication equipment 31 is sent to the receivers 322a to 322n via the antennas 321a to 321n in the train communication equipment 32 to be demodulated and output as reception outputs. The channel monitors 323a to 323n evaluate the qualities of the reception outputs and output the respective qualities as numerical values. Although various quality evaluation methods are available in this case, a method based on received power level is often used for an analog scheme; and a method based on a bit error rate (BER) or the like, for a digital scheme.

The channel quality comparator 324 compares the received power levels or BERs in the respective reception routes, sent from the channel monitors 323a to 323n, with each other to specify one reception route which is evaluated as a reception route having the highest channel quality. The receiver selection switch 325 receives all the reception outputs from the receivers 322a to 322n and has a function of selecting and outputting only one reception output from the receiver belonging to the reception route specified by the channel quality comparator 324.

The antennas 321a to 321n in the antenna unit 321 are arranged at spatially different positions. In general, multiplexed wave propagation occurs in mobile communication including train radio communication, resulting in a deterioration in communication quality. However, with the arrangement of a plurality of antennas installed at spatial different positions, even if the channel quality of a reception route including a given antenna deteriorates owing to multiplexed wave propagation, there is a possibility that good channel quality is maintained in some reception route including another antenna, because different multiplexed wave arrival environments are set in the respective reception routes. Therefore, optimum channel quality can be expected to be maintained by selecting a reception route having a high received power level or a reception route having a low BER with the arrangement described above.

In addition, a diversity reception unit including at least four directional antennas and three receivers is disclosed in Japanese Patent Laid-Open No. 61-72421. In this equipment, while diversity reception is performed by using two receivers, a search for a high-output antenna is made by using the remaining one receiver, thereby realizing better reception.

In such a conventional diversity reception unit, however, a plurality of reception routes, i.e., a plurality of antennas and a plurality of receivers and channel monitors are required. Consequently, the train communication equipment increases in size and cost.

SUMMARY OF THE INVENTION

It is an object of the present invention to provide an economical train radio communication system with a small equipment size.

It is another object of the present invention to provide a highly reliable train radio communication system.

In order to achieve the above objects, according to the present invention, there is provided a train radio communication system comprising a plurality of land communication equipments, arranged at predetermined intervals along a railroad on which a train travels, for outputting transmission signals having different frequencies, and a train communication equipment, arranged in the train, for setting a radio channel between the train communication equipment and one of the land communication equipments during travel of the train, the train communication equipment including a plurality of antennas for respectively receiving the transmission signals from the land communication equipments, an antenna switch for selecting one of the antennas, a receiver for demodulating an output from the antenna selected by the antenna switch and outputting a reception signal, and antenna control means, including current position detecting means for detecting a current traveling position of the train, for controlling the antenna switch in accordance with a current traveling position from the current position detecting means.

BRIEF DESCRIPTION OF THE DRAWINGS

FIG. 3 is a view for explaining an arrangement for the hand over operation of the train radio communication system of the present invention;

FIGS. 4A to 4D are timing charts for explaining the hand over operation of the arrangement in FIG. 3;

FIGS. 5A to 5K are timing charts showing the operation of the train radio communication system in FIG. 1;

DESCRIPTION OF THE PREFERRED EMBODIMENTS

Embodiments of the present invention will be described below with reference to the accompanying drawings.

Figure 1:
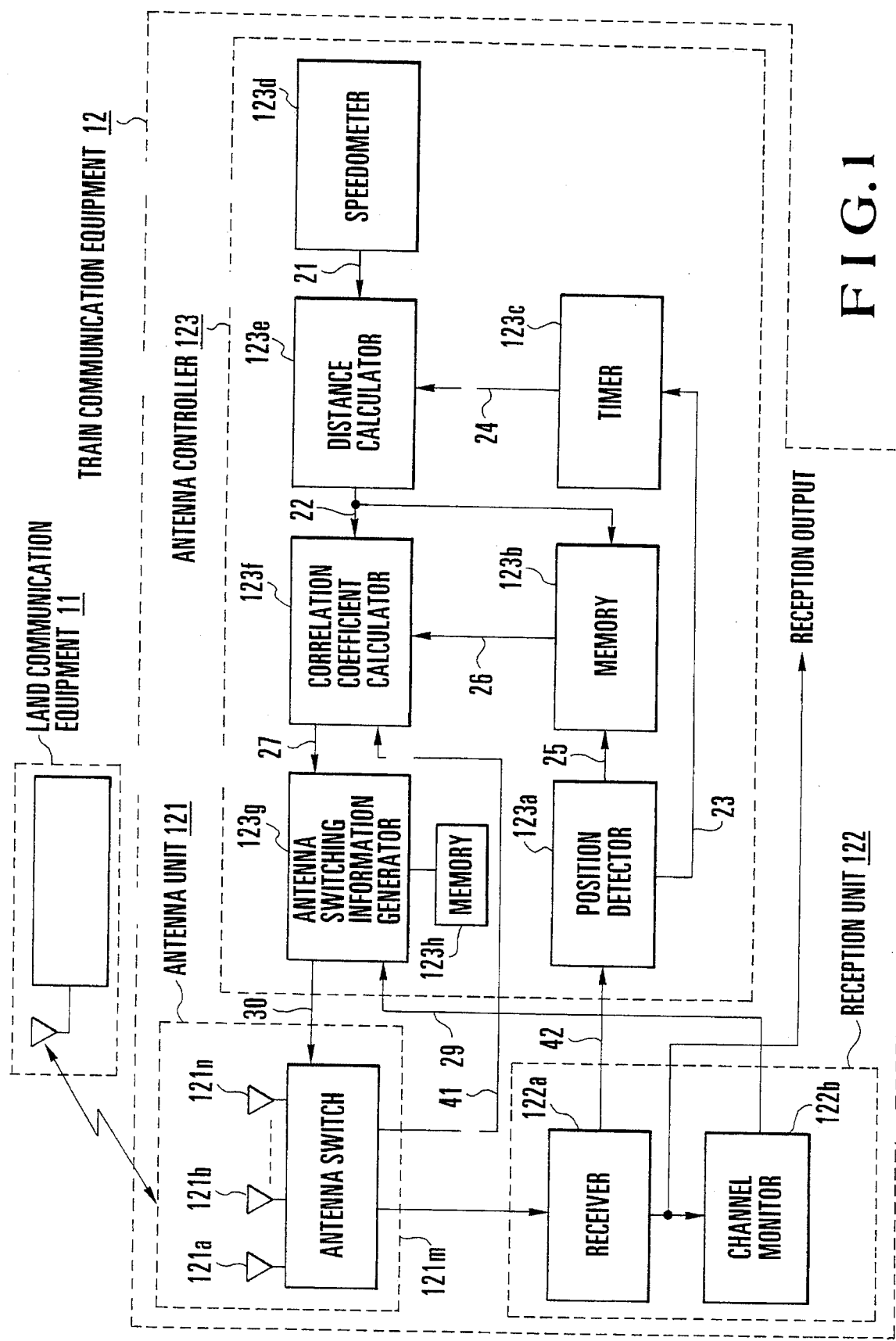
FIG. 1 is a block diagram showing a train radio communication system according to an embodiment of the present invention.
Figure 2:
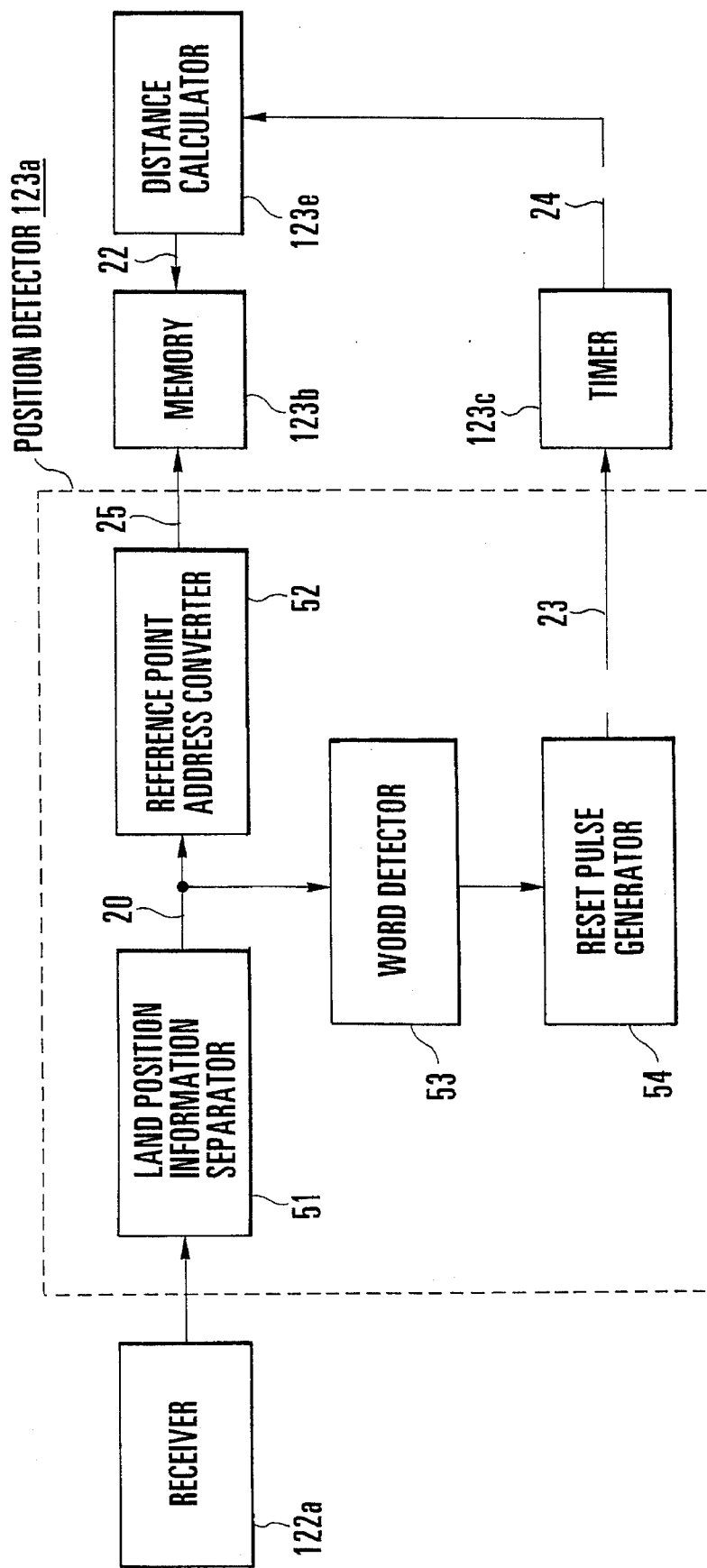
FIG. 2 is a block diagram showing the detailed arrangement of a position detector in FIG. 1.

FIG. 1 shows the arrangement of a train radio communication system according to an embodiment of the present invention. FIG. 2 shows the detailed arrangement of a position detector in the train radio communication system of the present invention. Referring to FIGS. 1 and 2, the train radio communication system comprises a plurality of land communication equipments 11 arranged at predetermined intervals along a railroad on which a train travels and designed to transmit transmission signals having different frequencies, and a train communication equipment 12 arranged in the train and designed to set a radio channel between the equipment 12 and one of the land communication equipments 11 during travel of the train.

The train communication equipment 12 comprises an antenna unit 121, a reception unit 122, and an antenna controller 123. The antenna unit 121 is constituted by a plurality of antennas 121a to 121n for receptively receiving transmission signals including land position information and sent from the land communication equipments 11, and an antenna switch 121m for selecting one of the antennas 121a to 121n. The reception unit 122 is constituted by a receiver 122a for demodulating an output from one of the antennas 121a to 121n, selected by the antenna switch 121m, and outputting a reception signal and land position information, and a channel monitor 122b for monitoring the quality of the reception signal received by the receiver 122a. The antenna controller 123 controls the antenna switch 121m in accordance with land position information from the receiver 122a and outputs from the channel monitor 122b and the antenna switch 121m. The antenna controller 123 in this embodiment sequentially sets, in a memory, antenna numbers corresponding to current positions obtained by using space correlation coefficients associated with spatial diversity control of the antennas 121a to 121n with respect to current position information, and operates the antenna switch 121m in accordance with the antenna numbers set in the memory. The antenna controller 123 will be described in detail below.

The antenna controller 123 includes a position detector 123a, a timer 123c, a speedometer 123d, a distance calculator 123e, a memory 123b, a correlation coefficient calculator 123f, a memory 123h, and an antenna switching information generator 123g. The position detector 123a outputs a reset pulse 23 every time the detector receives land position information 42 from each of the land communication equipments 11 installed at a plurality of reference points and detects one of the reference points. The position detector 123a then decodes the land position information 42 to detect an address 25 of the current reference point and outputs the address (lower address) of the reference point. The timer 123c is initialized in response to the reset pulse 23 from the position detector 123a and counts an elapsed time 24 afterward. The speedometer 123d measures a traveling speed 21 of the train. The distance calculator 123e is constituted by an integrator and designed to calculate a traveling distance 22 from a reference point detected on the basis of the traveling speed 21 from the speedometer 123d and the elapsed time 24 from the timer 123c. The memory 123b stores a radio wave propagation parameter associated with a current position in advance and outputs radio wave propagation parameters 26 associated with a current traveling position on the basis of the traveling distance (lower address) 22 from the distance calculator 123e and the address (lower address) 25 of the reference point from the position detector 123a. The correlation coefficient calculator 123f calculates a space correlation coefficient 27 at each current traveling position on the basis of the radio wave propagation parameters 26 from the memory 123b and a current antenna number 41 from the antenna switch 121m. The antenna switching information generator 123g compares the space correlation coefficients 27 from the correlation coefficient calculator 123f with each other, and stores an antenna number corresponding to the minimum correlation value in the memory 123h. In addition, the antenna switching information generator 123g outputs the contents (antenna switching information 30) of the memory 123h to the antenna switch 121m in response to an antenna switching request 29 from the channel monitor 122b.

FIG. 2 shows an example of the position detector 123a. A land position information separator 51 separates multiplexed land position information 20 from a reception signal sent from the receiver 122a and outputs the information to a reference point address converter 52 and a word detector 53. The reference point address converter 52 decodes the land position information 20 and converts it into the identification number of a distance reference point which the train is currently passing. The reference point address converter 52 then outputs the identification number, as the upper address 25 for reading out the radio wave propagation parameter from the memory 123b, to the memory 123b. The reference point address converter 52 includes a protective function of preventing output of an incorrect upper address 25 when an error occurs on a communication transmission path, and a function of systematically decoding the land position information 20 on the basis of past travel data and the like. The word detector 53 has a function of detecting a predetermined specific signal pattern included in the land position information 20 from the land position information separator 51. The word detector 53 outputs the detection result to a reset pulse generator 54. The specific signal pattern is a signal pattern transmitted between the train communication equipment 12 and each land communication equipment 11 in accordance with a predetermined procedure to determine a time reference point. The reset pulse generator 54 estimates, on the basis of past travel data, data of a received state, and the like, the time at which the train passes a distance reference point, and outputs the reset pulse 23 to the timer 123c at the moment when the train passes the distance reference point.

The operation of the train radio communication system having the above arrangement will be described below.

The hand over operation of the train radio communication system of the present invention will be briefly described first. In general, when the time point at which the train passes a reference point is to be accurately specified (within the range of an error of 1 m), a land communication equipment may perform position detection (using, e.g., an infrared sensor or a laser) with respect to the train communication equipment, and the resultant information may be multiplexed on transmission data to be supplied to the train communication equipment. Addition of a means for realizing this method leads to demerits of complicating the system and increasing the cost. Furthermore, a remarkable effect cannot be expected from this addition.

In this method, therefore, the method shown in FIGS. 3 and 4A to 4D is generally employed when one train communication equipment 12 continuously performs communication while passing a plurality of land communication equipments 11 (similar to the hand over operation of a vehicle telephone). More specifically, the train communication equipment 12 has a plurality of receiver systems and receives radio waves having different frequencies from two or more land communication equipments 11. As the distance to the currently selected land communication equipment 11 decreases, the train communication equipment 12 selects the next land communication equipment 11 before communication is disabled in terms of the directivity characteristics of the antennas, thereby continuously performing communication. The hand over operation employed by the present invention will be described in detail below with reference to FIGS. 3 and 4A to 4D.

FIG. 3 shows the geographical arrangement of the land communication equipments 11 of the train communication system, the arrangement of radio frequencies used, the arrangement of zones each serving as a unit of repetition of radio frequencies, and the transceiver arrangement of the train communication equipment 12. FIGS. 4A to 4D show an example of how the radio frequencies are switched to maintain an optimum communication state as the relative positional relationship between the land communication equipments 11 and the train communication equipment 12 changes with time during travel of the train.

Referring to FIG. 3, the land communication equipments 11 are arranged at given intervals along the traveling path of the train. Radio frequencies f1, f2, and f3 are sequentially assigned to the respective land communication equipments 11. Each land communication equipment 11 is communicating with the train communication equipment 12 with the corresponding radio frequency. The radio frequencies f1, f2, and f3 constitute a zone A, a zone B, ..., each serving as a unit of repetition of the radio frequencies. The train communication equipment 12 includes three transceivers of the radio frequencies f1, f2, and f3 to communicate with any land communication equipment.

A hand over operation to be performed when the train communication equipment 12 travels from the right to the left in FIG. 3 will be described next with reference to the timing charts in FIGS. 4A to 4D. The train communication equipment 12 is traveling while receiving a signal from the land communication equipment 11 located at a position a2 via the receiver of the radio frequency f1 at a position c1 in FIG. 4 ("FIG. 4D" will be omitted and only a position will be specified hereinafter). One of the receivers of the radio frequencies f1, f2, and f3 which is actually used for reception will be called a current receiver hereinafter. The train communication equipment 12 simultaneously receives RF signals having the radio frequencies f2 and f3 as well as an RF signal having the radio frequency f1 via the corresponding receivers. Referring to FIGS. 4A to 4C, the dotted lines respectively indicate channel qualities (e.g., received power levels or BERs) monitored by the respective receivers of the train communication equipment 12. A receiver exhibiting optimum channel quality is used as a current receiver, and a receiver having channel quality which is lower than that of the current receiver but is equal to or higher than a certain level at which no problem is posed in terms of communication is assigned as a spare receiver. The spare receiver is used for communication in place of the current receiver when the current receiver fails. At the position c1, the radio frequency f1 exhibits the highest channel quality, and the receiver of the radio frequency f1 is used as a current receiver to receive a signal from the land communication equipment 11 at the position a2. In addition, since the radio frequency f2 exhibits the second highest channel quality, the receiver of the radio frequency f2 is assigned as a spare receiver to receive a signal from the land communication equipment 11 at a position b2. At this time point, the receiver, in the train communication equipment 12, which corresponds to the radio frequency f3 is receiving a signal from the land communication equipment 11 at a position c2. However, since the radio frequency f3 exhibits the lowest channel quality, the receiver of the radio frequency f3 cannot be used for communication.

As the train communication equipment 12 in FIG. 3 moves in the traveling direction, the distances to the land communication equipments 11 located at the positions a2, b2, and c2 corresponding to the radio frequencies f1, f2, and f3 decrease. Therefore, all the channel qualities corresponding to the radio frequencies f1, f2, and f3 improve. When the train communication equipment 12 arrives at a position a distance Lmin before the position a2, the directivity range of the antenna connected to the receiver of the radio frequency f1 deviates from the directivity range of the antenna of the land communication equipment 11 located at the position a2. As a result, communication via the channel of the radio frequency f1 is disabled. The distance Lmin is determined by the directivity characteristics of the antennas of the train communication equipment 12 and the land communication equipment 11. For example, the distance Lmin is 30 to 50 m. At this time, the channel quality corresponding to the radio frequency f2 becomes the highest, and hence the receiver corresponding to the radio frequency f2 is used as a current receiver. In addition, since the channel quality corresponding to the radio frequency f3 in FIG. 4C exceeds the aforementioned level, the receiver corresponding to the radio frequency f3 is assigned as a spare receiver. In the system using such a hand over scheme, from the viewpoint of a currently selected one of a plurality of reception systems, reception of land position information which has been received is abruptly interrupted at the moment when a deviation from the directivity of the antenna occurs. From the viewpoint of a reception system which will receive a radio wave from the land communication equipment 11 next, the next land position information is abruptly received when the train arrives at a position where the information can be identified (after the received power level gradually increases as the train approaches the land communication equipment 11). During this period, there is a coexistence section (interval) in which two pieces of position information generated by the two land communication equipments 11 are properly received at once. Therefore, it is necessary to determine which one of the pieces of land position information is to be selected. Although various means for this determination can be considered, they can be classified into the following two methods:

method ①: monitoring received power levels and selecting the land communication equipment 11 having a higher received power level.

method ②: selecting the land communication equipment 11 having fewer errors by using a BER detection means or other error detection means (e.g., a CRC detection means).

At the time point at which pieces of land position information are detected, a switching method based on method ① or method ② is used to switch the land communication equipments 11. FIGS. 4A to 4D show switching processing of land position information in this embodiment.

This method of specifying land position information can be said to be a diversity reception scheme. However, the method is used for only a hand over scheme and is not the object of the present invention.

Note that each land communication equipment 11 has a general arrangement constituted by a multiplexer for transmission data, control signals, and land position information, a transmitter (modulating and radio sections), and an antenna.

Referring to FIGS. 1 and 4A to 4D, a large number of land communication equipments 11 are installed at predetermined intervals along a railroad to communicate with a train which is traveling. The train communication equipment 12 arranged in the train performs communication while sequentially switching the land communication equipments 11 with which the train communication equipment 12 communicates during travel of the train. FIG. 1 shows a case wherein one of the land communication equipments 11 and the train communication equipment 12 are communicating with each other.

The land communication equipment 11 multiplexes the land position information 42 on, e.g., an identification number transmission signal from the land communication equipment 11 and transmits the resultant signal to the train communication equipment 12. The antenna switch 121m of the antenna unit 121 selects one of the antennas 121a to 121n in accordance with the antenna switching information 30 from the antenna switching information generator 123g in the antenna controller 123 and connects the selected antenna to the receiver 122a in the reception unit 122.

The receiver 122a of the reception unit 122 receives the reception signal from the antenna unit 121 and performs processing necessary for radio communication, e.g., demodulation. Thereafter, the receiver 122a separates the land position information 42 multiplexed by the land communication equipment 11 from the reception signal and outputs the information to the position detector 123a in the antenna controller 123, and also outputs the reception signal to the channel monitor 122b. The channel monitor 122b converts the channel quality of the reception signal from the receiver 122a into a numerical value and evaluates the channel quality. If the channel quality deteriorates and becomes lower than a reference value 28, the channel monitor 122b outputs the antenna switching request 29 to the antenna switching information generator 123g in the antenna controller 123. In this case, as a means for converting a channel quality into a numerical value, a means based on received power level or BER is used.

The position detector 123a of the antenna controller 123 decodes the land position information 42 from the receiver 122a to detect the current traveling position, and converts the detection result into a numerical value, thereby outputting the address (upper address) 25 of the reference point to the memory 123b. In addition, every time the position detector 123a detects the land position information 42, the position detector 123a outputs the reset pulse 23 to the timer 123c to determine a time reference point on the basis of the land position information 42.

The memory 123b outputs various radio wave propagation parameters 26 associated with the current traveling position to the correlation coefficient calculator 123f in accordance with the following address information: the address 25 of the reference point, sent from the position detector 123a, and the traveling distance 22, output from the distance calculator 123e, which indicates the distance by which the train has traveled after passing the time reference point.

The timer 123c initializes its output in response to the reset pulse 23 from the position detector 123a as a time reference point, and outputs the elapsed time 24 after passing the time reference point to the distance calculator 123e.

The speedometer 123d digitizes the traveling speed 21 of the train and outputs the resultant data to the distance calculator 123e. The distance calculator 123e integrates the traveling speed 21 from the speedometer 123d by using the elapsed time 24 from the timer 123c to calculate a traveling distance after passing a given reference point. The distance calculator 123e digitizes the calculation result and outputs the resultant data as the traveling distance (lower address) 22 to the memory 123b and the correlation coefficient calculator 123f.

The correlation coefficient calculator 123f receives the radio wave propagation parameters 26 from the memory 123b, the traveling distance 22 from the distance calculator 123e, and the current antenna number 41 from the antenna switch 121m in the antenna unit 121, and calculates space correlation coefficients between the current antennas and the remaining antennas on the basis of the radio wave propagation parameters 26 and the traveling distance 22. The correlation coefficient calculator 123f outputs the calculation results, as the space correlation coefficients 27, to the antenna switching information generator 123g.

The antenna switching information generator 123g compares the space correlation coefficients 27 with each other, and stores the number of an antenna exhibiting the minimum correlation value in the memory 123h. In response to the antenna switching request 29 from the channel monitor 122b in the reception unit 122, the antenna switching information generator 123g outputs the stored number of the antenna exhibiting the minimum correction value, as the antenna switching information 30, to the antenna switch 121m in the antenna unit 121.

The operation of this embodiment will be briefly described next with reference to FIGS. 5A to 5K. Referring to FIGS. 5A to 5K, the axis of abscissa is the time axis, and the downward arrows on the axis indicate that the train passes distance reference points 0, 1, 2, and 3 at times T0, T1, T2, and T3, respectively. The intervals between the respective reference points will be referred to as sections 0 (between the reference points 0 and 1), 1, 2, and 3 hereinafter for the sake of convenience. Assume that the train gradually accelerates in the section 0; travels at a constant speed in the section 1; and gradually decelerates in the section 2. The operation of each component of the antenna controller 123 as one of the basic components of this embodiment will be described below on these assumptions.

As shown in FIG. 5A, an output (traveling speed 21) from the speedometer 123d exhibits a positive inclination in the section 0; no inclination in the section 1; and a negative inclination in the section 2 according to the above assumptions. As shown in FIG. 5C, when the train passes each distance reference point, the reset pulse 23 having a certain width is output from the position detector 123a. A given time reference point is defined by the time corresponding to the trailing edge of the reset pulse 23. The timer 123c operates from this time reference point to the next time reference point and outputs the elapsed time 24 (timer output) shown in FIG. 5D. The distance calculator 123e integrates the output (traveling speed 21) from the speedometer 123d by using the output (elapsed time 24) from the timer 123c, and calculates/outputs the traveling distance 22 (distance calculator output) shown in FIG. 5B after passing the time reference point.

As shown in 5E, every time the train passes a distance reference point, the position detector 123a outputs an identification number fixed to a corresponding reference point (the position or the like of the land communication equipment 11) as the address 25 (position detector output) of the reference point. The memory 123b outputs the radio wave propagation parameters 26 shown in FIG. 5F at the current traveling position in accordance with the output (address 25) from the position detector 123a and the output (traveling distance 22 from the reference point) from the timer 123c as address information.

The correlation coefficient calculator 123f always calculates and outputs the space correlation coefficients 27 (correlation coefficient calculator outputs), shown in FIG. 5G, between the currently used antenna and the remaining antennas by using the radio wave propagation parameters 26 (memory outputs) in the respective sections, output from the memory 123b, and the traveling distances 22 output from the distance calculator 123e. FIG. 5H shows channel qualities monitored by the channel monitor 122b. More specifically, in the section 0, the antenna switch 121m selects an antenna 1 and the channel quality is good at first, but the channel quality gradually deteriorates with time. At time t0, the channel quality becomes lower than a given reference value (the chain line). For the sake of simplicity, FIGS. 5A to 5K show a case wherein the number of antennas is three (n=3). The correlation coefficient calculator 123f calculates a space correlation coefficient (1, 2) between the antenna 1 as the current antenna and an antenna 2 and a space correlation coefficient (3, 1) between the antenna 1 and an antenna 3 until time t0.

As shown in FIG. 5I, since the channel quality becomes lower than the reference value at time t0, the antenna switching request 29 (channel monitor output) is output from the channel monitor 122b to the antenna switching information generator 123g. The antenna switching information generator 123g compares the space correlation coefficient (1, 2) with the space correlation coefficient (3, 1) and stores information indicating an antenna exhibiting a smaller correlation value until time t0. The antenna switching information generator 123g receives the antenna switching request 29 at time t0. Since the space correlation coefficient (1, 2) is larger than the space correlation coefficient (3, 1) at this time point, the antenna switching information generator 123g outputs the antenna switching information 30 (antenna switching information generator output, i.e., antenna number 3) to select the antenna 3 exhibiting a smaller correlation value with respect to the antenna 1, as shown in FIG. 5J. The antenna switch 121m in the antenna unit 121 switches to the antenna 121c (antenna number 3) as the current antenna in accordance with this antenna number. Similarly, at time t1 in the section 1, the channel quality becomes lower than the reference value again, and the antenna switching request 29 shown in FIG. 5I is output. As shown in FIG. 5J, at this time point, the antenna 121b (antenna number 2) exhibiting a small correlation value with respect to the antenna 121c (antenna number 3) is selected and switched. Subsequently, every time the channel quality becomes lower than the reference value, control is performed to switch to an antenna exhibiting a small correlation value with respect to the current antenna according to the same procedure as described above.

Figure 6:
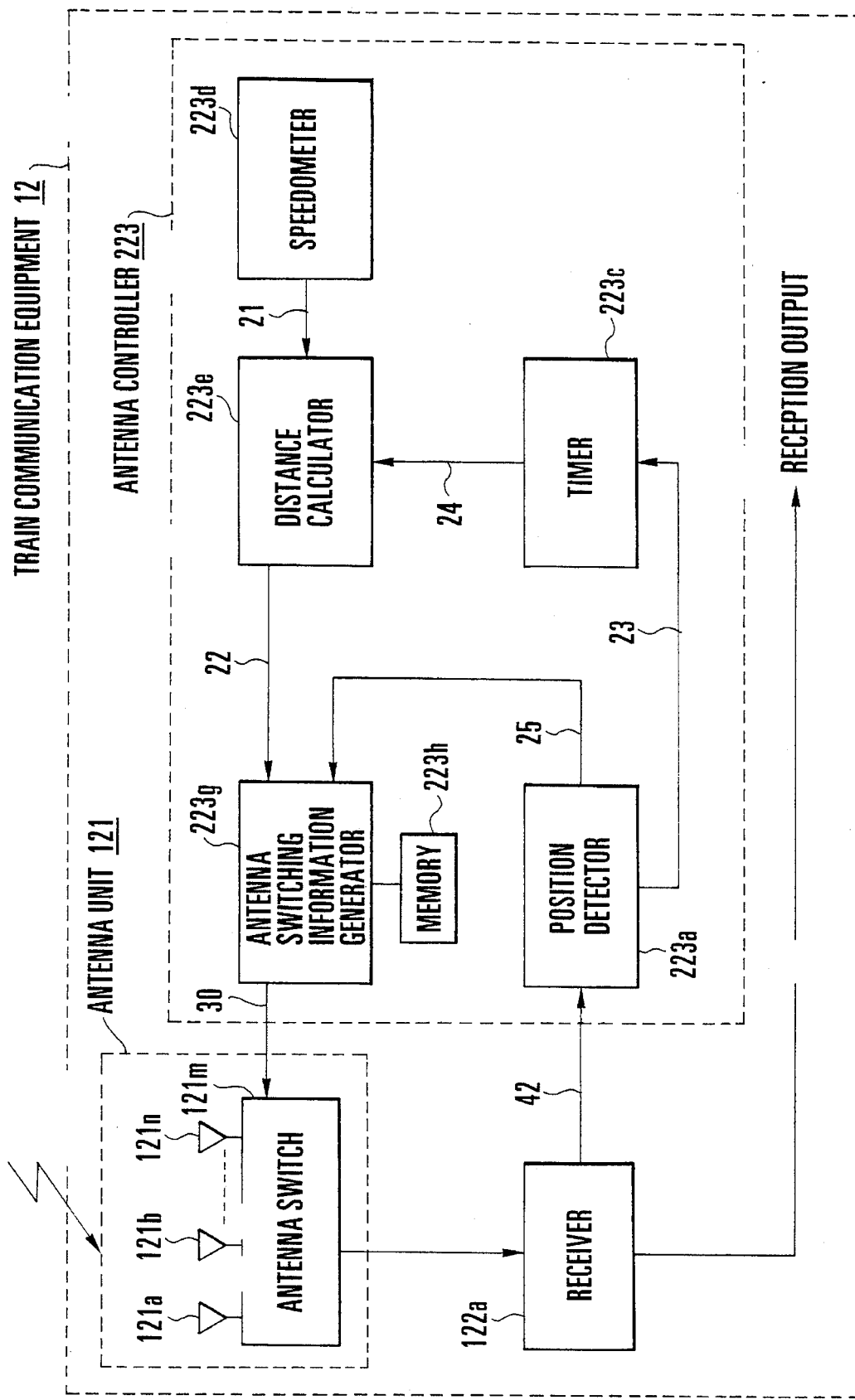
FIG. 6 is a block diagram showing a train communication equipment in a train radio communication system according to another embodiment of the present invention.
Figure 7:
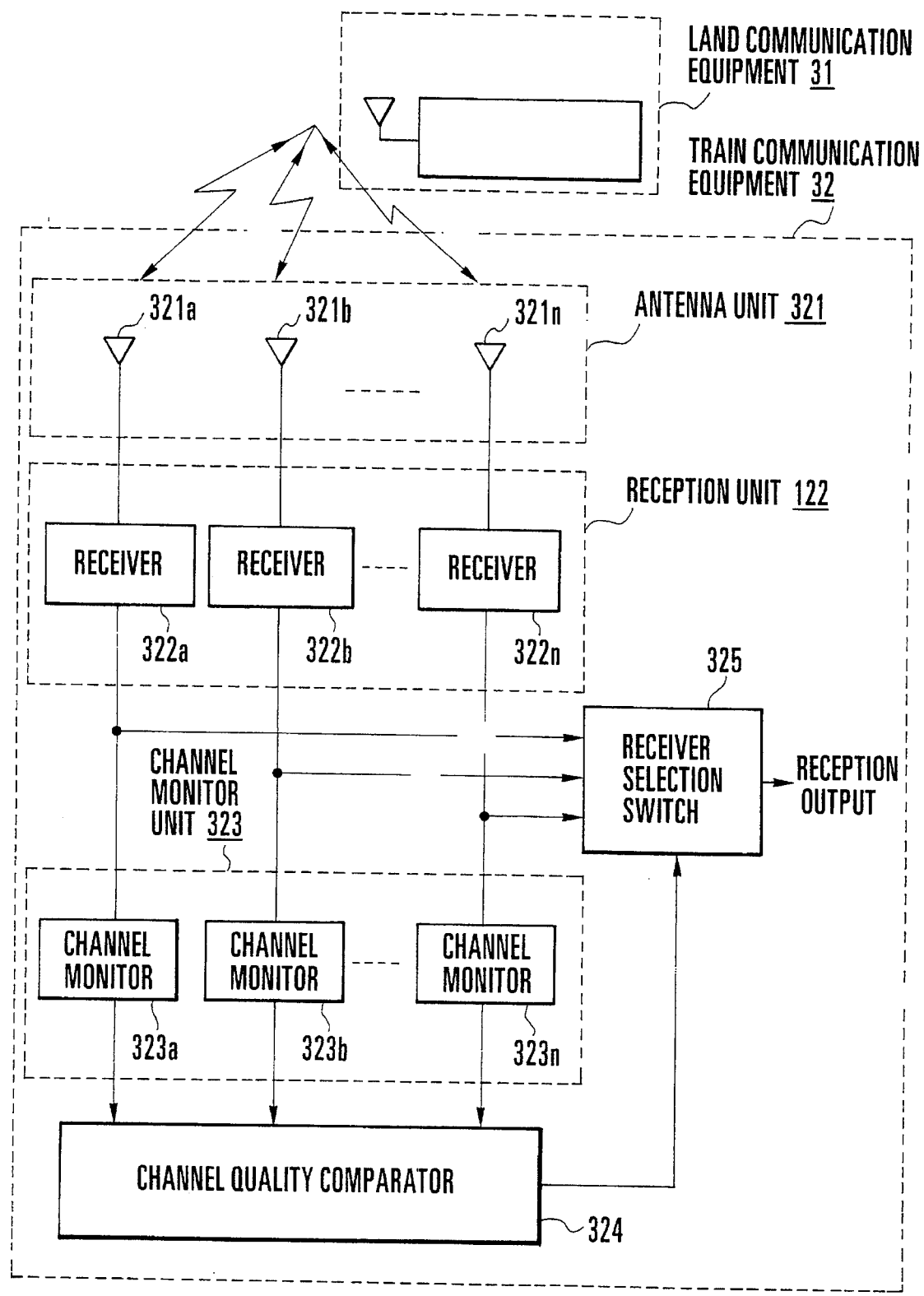
FIG. 7 is a block diagram showing a conventional train radio communication system.

In the above embodiment, antenna switching is performed by using space correlation coefficients. However, space correlation coefficients at the respective traveling positions need not be used because a train travels the regular route unlike a vehicle. More specifically, in order to obtain an antenna switching pattern, the train is made to travel for measurement. A plurality of pairs of receivers and channel monitors are mounted in the train, and outputs from the respective channel monitors at the respective traveling positions are measured, thereby determining an optimum switching pattern on the basis of the measurement values. FIG. 6 shows a train communication equipment 12 using the switching pattern obtained in this manner as antenna switching information according to another embodiment of the present invention. The same reference numerals in FIG. 6 denote the same parts as in FIG. 1, and a description thereof will be omitted.

Referring to FIG. 6, the obtained optimum switching pattern is stored in a memory 223h of an antenna controller 223 in advance. During operation/travel of the train, an antenna switching information generator 223g accesses the memory 223h on the basis of an upper address 25 from a position detector 223a and a lower address 22 from a distance calculator 223e. The distance calculator 223e calculates a traveling distance from a reference point on the basis of outputs from a speedometer 223d and a timer 223c. Antenna information corresponding to the current traveling position is read out from the accessed memory 223h in accordance with the stored switching pattern. The antenna switching information generator 223g switches an antenna switch 121m in accordance with the antenna information read out from the antenna switching information generator 223g. Note that the same reference numerals in FIG. 6 denote the same parts as in FIG. 1, and a description thereof will be omitted.

In this embodiment, the channel monitor 122b, the correlation coefficient calculator 123f, and the memory 123b shown in FIG. 1 can be omitted, while one receiver 122a is used as in the first embodiment.

As a method of obtaining a current traveling position, the embodiment shown in FIG. 6 uses the method of detecting a current traveling position from each reference point position obtained from land position information from the land communication equipment 11 and a calculated distance from this reference point position. However, a current traveling position may be detected on the basis of a calculated distance from the first reference point. Referring to FIG. 6, the timer 223c is reset when the train starts to travel from the start point, and the distance calculator 223e calculates the distance from the start point on the basis of outputs from the timer 223c and the speedometer 223d, thereby detecting a current traveling position. In this case, land position information from each land communication equipment 11 and the position detector 123a can be omitted, and the timer 223c may be manually reset or automatically reset when the train starts to travel in the reverse direction.

As has been described above, according to the radio communication system of the present invention, since an optimum antenna is selected by using the current traveling position of the train as a parameter, a highly reliably, economical system with a small equipment size can be realized.

What is claimed is:

1. A train radio communication system comprising a plurality of land communication equipments, arranged at predetermined intervals along a railroad on which a train travels, for outputting transmission signals having different frequencies, and a train communication equipment, arranged in the train, for setting a radio channel between said train communication equipment and one of said land communication equipments during travel of the train, said train communication equipment including:

a plurality of antennas for respectively receiving the transmission signals from said land communication equipments;

an antenna switch for selecting one of said antennas;

a receiver for demodulating an output from said antenna selected by said antenna switch and outputting a reception signal; and antenna control means, including current position detecting means for detecting a current traveling position of the train, for controlling said antenna switch in accordance with a current traveling position from said current position detecting means.

2. A system according to claim 1, further comprising channel monitor means for monitoring quality of the reception signal from said receiver and outputting an antenna switching request when the quality of the reception signal becomes lower than a reference value, and wherein said antenna control means switches said antenna switch on the basis of land position information when an antenna switching request is generated by said channel monitor means.

3. A system according to claim 1, further comprising a first memory for storing antenna switching information along the railroad on which the train travels, and wherein said antenna control means switches said antenna switching means in accordance with the antenna switching information stored in said first memory.

4. A system according to claim 3, wherein said antenna control means comprises a second memory for storing propagation parameters corresponding to traveling positions of the train in advance and outputting a propagation parameter in accordance with a current traveling position from said current position detecting means, a correlation coefficient calculator for calculating correlation coefficients between one of said antennas, selected on the basis of the propagation parameter from said second memory and the current traveling position from said current position detecting means, and said remaining antennas, and an antenna switching information generator for causing said first memory to store an antenna number corresponding to a minimum correlation coefficient of the correlation coefficients from said correlation coefficient calculator as antenna switching information and for outputting the stored antenna number to said antenna switch.

5. A system according to claim 3, wherein a switching pattern corresponding to current traveling positions of the train which are obtained by causing the train to travel on the railroad and executing spatial diversity reception is stored, as antenna switching information, in said first memory in advance, and said antenna control means comprises an antenna switching information generator for obtaining an antenna number corresponding to a current traveling position supplied from said current position detecting means from the switching pattern stored in said first memory and outputting the antenna number to said antenna switch.

6. A system according to claim 1, wherein a transmission signal from each of said land communication equipments includes land position information, and said current position detecting means comprises a reference position detector for detecting a reference position on the basis of land position information from each of said land communication equipments, a speedometer for measuring a speed of the train, and a distance calculator for calculating a traveling distance from a reference position detected by said reference position detector on the basis of an output from said speedometer, and detects a current traveling position on the basis of the reference position detected by said reference position detector and the traveling distance calculated by said distance calculator.

7. A system according to claim 1, wherein said current position detecting means comprises a speedometer for detecting a speed of the train, and a distance calculator for detecting an entire traveling distance from a traveling start position of the train on the basis of an output from said speedometer, and detects a current traveling position on the basis of the total traveling distance calculated by said distance calculator.

8. A train radio communication system comprising a plurality of land communication equipments, arranged at predetermined intervals along a railroad on which a train travels, for outputting transmission signals having different frequencies, and a train communication equipment, arranged in the train, for setting a radio channel between said train communication equipment and one of said land communication equipments during travel of the train, said train communication equipment including:

a plurality of antennas for respectively receiving the transmission signals from said land communication equipments;

an antenna switch for selecting one of said antennas;

a receiver for demodulating an output from said antenna selected by said antenna switch and outputting a reception signal;

channel monitor means for monitoring quality of a reception signal from said receiver and outputting an antenna switching request when the quality of the reception signal becomes lower than a reference value; and antenna control means, including current position detecting means for detecting a current traveling position of the train on the basis of land position information from said receiver and a traveling speed of the train, for controlling said antenna switch in accordance with the current traveling position from said current position detecting means in response to an antenna switching request generated by said channel monitor means.

* * * * *